March 31, 1970
V. M. MOGILEVSKY
3,504,277
VIBRATION MAGNETOMETER FOR MEASURING THE TANGENTIAL COMPONENT
OF A FIELD ON SURFACES OF FERROMAGNETIC SPECIMENS
UTILIZING A MAGNETOSTRICTIVE AUTOOSCILLATOR
Filed Sept. 13, 1967
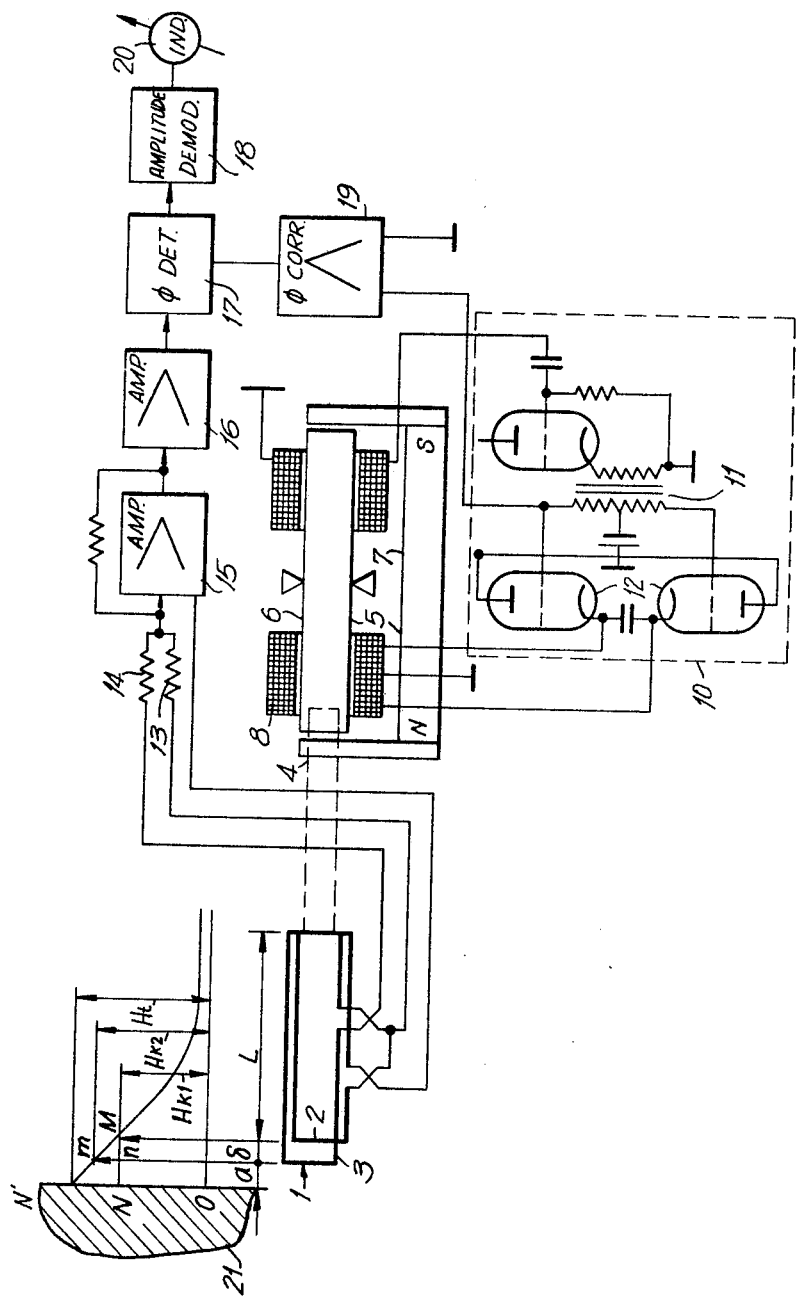

United States Patent Office 3,504,277
Patented Mar. 31, 1970

3,504,277
VIBRATION MAGNETOMETER FOR MEASURING THE TANGENTIAL COMPONENT OF A FIELD ON SURFACES OF FERROMAGNETIC SPECIMENS UTILIZING A MAGNETOSTRICTIVE AUTOOSCILLATOR
Vitaly Moritsevich Mogilevsky, Ul. Gogolya 49, kv. 39, Novosibirsk, U.S.S.R.
Filed Sept. 13, 1967, Ser. No. 667,404
Int. Cl. G01r *33/02*
U.S. Cl. 324—43                               2 Claims

ABSTRACT OF THE DISCLOSURE

A vibration magnetometer for measuring the tangential component of a stationary and magnetic field acting on the flat surface of a ferromagnetic specimen, by means of measuring coil vibrating in a plane normal to the direction of the tangential component of the field. The measuring coil is imparted oscillatory motion by a magnetostrictive autooscillator, with whose oscillating rod said coil is rigidly connected. For the purpose of improving stability and the precision of measurements, the amplifier of said autooscillator employs cathode followers with a step-up transformer for interstage coupling. The measuring coil is made of two sections connected in series opposition, in which sections there are induced signals converted by an operational amplifier into a signal proportional to the field acting on the surface of the specimen. Amplitude-modulated signals, induced in the measuring coil when measuring alternating fields, are demodulated by an amplitude demodulator.

The present invention relates to devices used for measuring magnetic quantities and, in particular, to devices used for measuring the tangential component of the intensity of a magnetic field on flat surfaces of ferromagnetic materials and, also, for measuring the induction in narrow air gaps of magnetic circuits such as is the case, for example, in permanent-magnet moving-coil instruments.

Known in the art are vibration magnetometers with sensing elements in the form of a rectangular coil made up of two sections of different length having a series-opposing connection, the coil being coupled with a vibrodrive that sustains the continuous sinusoidal oscillations of the coil at a constant frequency and amplitude. The vibro-drive of known magnetometers is, essentially, a turning fork that is fitted with excitation and supply coils provided with a positive feedback through a stable amplifier employing, for example, cathode followers and a transformer interstage coupling. The signals supplied from the measuring coil sections, the end parts of which vibrate about fixed points aligned perpendicular to the surface of the ferromagnetic specimen within the region of linear decrease of the tangential component of the magnetic field, contain harmonics that are in proportion to the tangential components of the field at the above-mentioned points.

By means of a resolver in the form—as an example— of an operational amplifier, the mentioned signals are converted automatically into a signal that is in proportion to the intensity of the tangential component of the magnetic field acting on the surface of the ferromagnetic specimen. This converted signal is rectified by a phase-sensitive detector and measured by means of a voltmeter having a scale directly graduated in units of intensity of the magnetic field.

A disadvantage of known magnetometers is that tuning fork vibro-drives for frequencies of oscillation above 3 kc./s. cannot be made of sufficient capacity. Therefore, in order to improve the sensitivity of the instrument it becomes necessary to increase the number of turns of the coil. This introduces an error dependent upon the ultimate section of the coil that cannot be easily taken into account and makes it more difficult to take measurements in narrow air gaps of magnetic circuits. Another disadvantage of known magnetometers is that they are unsuitable for measuring quickly varying fields, the period of which is to be much greater than the time of damping of the voltmeter measuring the signal that is in proportion to the intensity of the magnetic field.

A primary object of the present invention is to eliminate said disadvantages.

A further object of this invention is to provide a magnetometer suitable for measuring the amplitude of periodic low-frequency alternating magnetic fields acting on the flat surface of ferromagnetic materials or within narrow air gaps of magnetic circuits and, also, to raise the sensitivity of the magnetometer without necessarily increasing the number of turns of the measuring coil, thus reducing the error of measurement and improving the interference-free performance of the instrument.

According to the present invention these and other objects are attained by the development of a magnetometer wherein an amplitude demodulator is introduced into the measuring channel at the input of secondary measuring instrument, and a magnetostrictive autooscillator is in operative liaison with the receiving coil-type device, the autooscillator being provided with an oscillating rod of temperature-compensated material carrying excitation and supply coils into the positive feedback circuit of which an amplitude-stabilized amplifier is inserted.

It is recommended that the latter amplifier be of a multistage type employing cathode followers with a step-up transformer as an interstage coupling unit and with the final stage in the form of a push-pull amplifier employing cathode followers.

The present invention will further be described by way of example with reference to the accompanying drawing representating the circuit diagram of the vibration magnetometer in accordance with the invention.

A two-section measuring coil, incorporating section 2 of length L and section 3 of length $L+\delta$ is fixed by means of a light angle bracket 4 to the oscillating element of the vibro-drive. The vibro-drive is a magnetostrictive autooscillator comprising magnetic circuit 5 that consists of oscillating rod 6 of laminated temperature-compensated material and permanent magnet 7, excitation coil 8 tuned to the mechanical resonance frequency of oscillating rod 6 and supply coil 9 connected to the output and input of amplifier 10 employing cathode followers with step-up transformers 11 as interstage coupling elements and final-stage push-pull amplifiers 12 employing cathode followers.

The sections of the measuring coil are arranged so as to lie in the same plane; the coil section ends facing the vibro-drive are brought together, whereas the ends facing the ferromagnetic specimen during measurements are spaced at a distance $\delta$ from each other.

Two-section measuring coil 1 is connected to input resistors 13 and 14 of the summator-multiplier for which purpose operational amplifier 15 is used. The output of amplifier 15 is connected to linear amplifier 16 having a pass band which corresponds to the resonant frequency of the vibrator. The output of amplifier 16 is connected to phase-sensitive detector 17, and the output of the latter is connected to amplitude demodulator 18. The reference volage is supplied to phase-sensitive detector 17 from amplifier 10 through amplifier-phase corrector 19. The output of amplitude demodulator 18 is connected to indicating instrument 20 graduated directly in magnetic units.

The above-described magnetometer operates in the following manner. An excitation of coil 8 by an alternating current having a frequency equal to that of the mechanical resonance of oscillating rod 6, an E.M.F. set up by the reverse magnetostrictive effect is induced in supply coil 9. The continuous oscillations of the vibrator are sustained within the positive feedback circuit by amplifier 10 employing cathode followers with step-up transformer 11 as an interstage coupling element. The final stage of amplifier 12 employs a push-pull circuit with cathode followers. Due to such an arrangement, the direct component of the anode current does not pass through excitation coil 8, thus ensuring full stability of the polarizing field produced by permanent magnet 7.

The measurement of the tangential component of the magnetic field is based on the well known effect of linear decrease of the field tangential component at points lying on planes that are orthogonal in respect to the vector of the magnetic field acting on the surface of the specimen.

This effect is utilized in the present invention by positioning sections 2 and 3 of measuring coil 1 in respect to specimen 21 so that the planes of their turns are orthogonal to the field vector acting on the flat surface of the specimen, the ends of the sections of measuring coil 1 being spaced at distances $d$ and $d+\delta$ from the surface of the specimen.

When measuring the tangential component of the permanent field acting on the surface of specimen 21, an E.M.F. is induced in sections 2 and 3 of measuring coil 1 that vibrate with the frequency of oscillation of the magnetostrictive autooscillator. The induced E.M.F. is directly proportional to the tangential component of the field established in the planes spaced at distances $d$ and $d+\delta$ from the surface of specimen 21.

Due to the series-opposing connection of sections 2 and 3 and the provision of operational amplifier 15, the field on the surface of the specimen is extrapolated according to signals that are in proportion to the field intensity on planes spaced at distances $d$ and $d+\delta$ from the surface of specimen 21. As a result of this extrapolation the signal obtained at the output of operational amplifier 15 is expressed as follows:

$$E_{15}=E_2+E_{2-3}\frac{\delta+d}{d}=kH_t\cos\omega t+E_{15}\sin 2\omega t$$

where $H_t$ is the tangential component of the magnetic field on the surface of the ferromagnetic specimen;
$E_{15}$ is the signal obtained at the output of amplifier 15;
$E_2$ is the signal supplied from section 2;
$E_{2-3}$ is the signal derived from the series-opposing connected sections 2 and 3 of coil 1.

Amplifier 16 does not pass the component of signal $E_{15}\sin 2\omega t$ of $2\omega$ frequency. The output signal of amplifier 16 expressed as $V_{output}=KH_t\cos\omega t$ is rectified by phase-sensitive detector 17 and is measured by indicating instrument 20.

Measurement of an alternating field or induction involves amplitude modulation by a signal proportional to the field of a frequency equal to that of the frequency of oscillation of the magnetostrictive vibro-drive. The amplitude-modulated signal is demodulated by demodulator 18 and measured by indicating instrument 20. Since the frequency of the magnetostrictive vibrator may be as high as 20 to 100 kc./s., accurate measurements of the amplitude of a low-frequency signal can be easily made at frequencies of about several hundred c.p.s.

The induction is measured within the air gaps of magnetic circuits by the use of only one section of the measuring coil inserted into the gap.

I claim:

1. A vibration magnetometer for measuring the tangential component of the intensity of a magnetic field set up on the surface of a test specimen, as well as the induction occurring within the air gaps of magnetic circuits and comprising: a measuring channel consisting of series-connected coil-type devices introduced into the measured field for obtaining a signal that varies in proportion to the magnetic characteristics of the field, an operational amplifier coupled to said devices for converting the said signal into a signal that is in proportion to the magnetic parameter being measured, a phase-sensitive detector coupled to said amplifier for converting the latter said signal in such a manner that its polarity coincides with the polarity of the measured magnetic field, a measuring instrument coupled to said detector for evaluating the converted signal in terms of absolute magnetic units; an amplitude demodulator coupled between the said phase-sensitive detector and the measuring instrument for separating out a low-frequency component, that varies in proportion to the measured magnetic parameter, from the signal received from the detector; a magnetostrictive autooscillator coupled to and adapted for maintaining the oscillations of the above-mentioned coil-type devices at a constant amplitude and ultrasonic frequency; said oscillator including an oscillating rod of a temperature-compensated material and further including excitation and supply coils on the said oscillating rod and a positive feed-back circuit coupling said excitation and supply coils; an amplitude-stabilized amplifier in said positive feedback circuit; and a phase-correcting amplifier connected between the said phase-sensitive detector and the amplitude-stabilized amplifier.

2. A magnetometer according to claim 1, wherein the amplitude-stabilized amplifier is of a multistage type including stages of cathode followers and a step-up transformer constituting an interstage coupling unit, the last of the stages being a push-pull amplifier including a cathode follower.

References Cited

UNITED STATES PATENTS

| | | | |
|---|---|---|---|
| 1,937,583 | 12/1933 | Norrman | 331—156 |
| 2,759,102 | 8/1956 | Burns | 331—156 |
| 2,776,404 | 1/1957 | Caldecourt | 324—47 |

FOREIGN PATENTS

| | | |
|---|---|---|
| 1,173,412 | 2/1959 | France. |

GERARD R. STRECKER, Primary Examiner

R. J. CORCORAN, Assistant Examiner

U.S. Cl. X.R.

331—157